US009638367B2

United States Patent
Iijima et al.

(10) Patent No.: US 9,638,367 B2
(45) Date of Patent: May 2, 2017

(54) SATURATOR AND NATURAL GAS REFORMING SYSTEM PROVIDED WITH SAME

(71) Applicant: MITSUBISHI HEAVY INDUSTRIES, LTD., Tokyo (JP)

(72) Inventors: Masaki Iijima, Tokyo (JP); Masato Matsuzawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 101 days.

(21) Appl. No.: 14/437,076

(22) PCT Filed: Sep. 5, 2013

(86) PCT No.: PCT/JP2013/073924
§ 371 (c)(1),
(2) Date: Apr. 20, 2015

(87) PCT Pub. No.: WO2014/065020
PCT Pub. Date: May 1, 2014

(65) Prior Publication Data
US 2015/0276112 A1    Oct. 1, 2015

(30) Foreign Application Priority Data

Oct. 26, 2012   (JP) ................. 2012-236672

(51) Int. Cl.
*B01J 19/24*         (2006.01)
*C01B 3/34*          (2006.01)
(Continued)

(52) U.S. Cl.
CPC ............ *F16L 53/002* (2013.01); *B01J 19/24* (2013.01); *C01B 3/34* (2013.01); *C01B 3/384* (2013.01);
(Continued)

(58) Field of Classification Search
CPC combination set(s) only.
See application file for complete search history.

(56) References Cited

U.S. PATENT DOCUMENTS 3,861,165 A  *  1/1975  Hirano ................. B01D 53/265
                                              62/150
4,545,976 A  *  10/1985  Osman ................... C01B 3/382
                                              252/373
(Continued)

FOREIGN PATENT DOCUMENTS

EP           0351711 A2    1/1990
EP           0766050 A2    4/1997
(Continued)

OTHER PUBLICATIONS

Extended (Supplementary) European Search Report (EESR) dated May 30, 2016, issued in counterpart European Patent Application No. 13849858.9. (8 pages).
(Continued)

*Primary Examiner* — Kaity Handal
(74) *Attorney, Agent, or Firm* — Westerman, Hattori, Daniels & Adrian, LLP (57) ABSTRACT

A saturator includes: a flow path inside of which a first fluid flows; a first heat exchange unit that causes heat exchange between the first fluid and a second fluid; a second heat exchange unit that causes heat exchange between a third fluid and the first fluid after the first fluid has passed through the first heat exchange unit; a humidifying unit that adds water to the first fluid upstream from the first heat exchange unit and the second heat exchange unit; and a conveyance path that conveys the third fluid after heat exchange from the second heat exchange unit to the upstream side of the first heat exchange unit and causes said third fluid to flow into the flow path as the first fluid.

3 Claims, 5 Drawing Sheets (51) Int. Cl.
*F28D 15/00* (2006.01)
*F16L 53/00* (2006.01)
*C01B 3/38* (2006.01)

(52) U.S. Cl.
CPC .............. *C01B 2203/0233* (2013.01); *C01B 2203/0805* (2013.01); *C01B 2203/0811* (2013.01); *C01B 2203/1058* (2013.01); *C01B 2203/1241* (2013.01); *C01B 2203/1276* (2013.01); *Y10T 137/6579* (2015.04)

(56) References Cited

U.S. PATENT DOCUMENTS

| | | | | |
|---|---|---|---|---|
| 4,595,459 | A * | 6/1986 | Kusakawa | B01D 3/346 159/16.1 |
| 4,799,941 | A * | 1/1989 | Westermark | B01D 5/0036 110/215 |
| 4,980,145 | A | 12/1990 | Hsiung et al. | |
| 5,607,011 | A * | 3/1997 | Abdelmalek | B01D 53/002 165/104.14 |
| 5,715,696 | A * | 2/1998 | Salvagno | B01D 5/0039 55/490.1 |
| 5,782,104 | A * | 7/1998 | Sami | B01D 53/261 62/238.1 |
| 6,159,395 | A | 12/2000 | Early et al. | |
| 6,218,439 | B1 | 4/2001 | Kobayashi et al. | |
| 2003/0092945 | A1 | 5/2003 | Seiki et al. | |
| 2004/0089438 | A1 | 5/2004 | Valensa et al. | |
| 2004/0099140 | A1 * | 5/2004 | Hesse | B01D 53/268 96/8 |
| 2005/0121304 | A1 * | 6/2005 | Beckman | B01D 1/22 203/2 |
| 2005/0188619 | A1 | 9/2005 | Rostrup-Nielsen et al. | |
| 2006/0151156 | A1 | 7/2006 | Valensa et al. | |
| 2006/0260468 | A1 * | 11/2006 | Amin | B01D 53/265 95/153 |
| 2011/0086281 | A1 | 4/2011 | Huber et al. | |
| 2012/0279227 | A1 * | 11/2012 | Timmins | B01D 53/002 60/772 |

FOREIGN PATENT DOCUMENTS

| | | |
|---|---|---|
| EP | 0946275 B1 | 11/2001 |
| JP | 63-315502 A | 12/1988 |
| JP | 2-97401 A | 4/1990 |
| JP | 2000-313601 A | 11/2000 |
| JP | 2001-506921 A | 5/2001 |
| JP | 2002-193864 A | 7/2002 |
| JP | 2003-34660 A | 2/2003 |
| JP | 2003-521576 A | 7/2003 |
| JP | 2004-277186 A | 10/2004 |
| RU | 2 457 024 C2 | 7/2012 |

OTHER PUBLICATIONS

Decision to Grant a Russian Patent dated May 30, 2016, issued in counterpart Russian Patent Application No. 2015115158, with English translation. (13 pages).

Consonni et al., "Decarbonized hydrogen and electricity from natural gas", International Journal of Hydrogen Energy, vol. 30, No. 7, avaliabe online Sep. 12, 2004, pp. 701-718.

International Search Report dated Oct. 8, 2013 issued in corresponding application No. PCT/JP2013/073924.

Written Opinion of the International Searching Authority dated Oct. 8, 2013 issued in corresponding application No. PCT/JP2013/073924.

Notice of Acceptance dated Dec. 22, 2015, issued in counterpart Australian Application No. 2013335985 (3 pages).

A Decision to Grant a Patent dated Mar. 22, 2016, issued in counterpart Japanese Patent Application No. 2012-236672, with English translation. (7 pages).

\* cited by examiner

SATURATOR AND NATURAL GAS REFORMING SYSTEM PROVIDED WITH SAME

TECHNICAL FIELD

The present invention relates to a saturator for adding water vapor to a gas. Moreover, the present invention relates to a natural gas reforming system provided with the saturator.

BACKGROUND ART

In the methanol synthesis process and a process to synthesize liquid hydrocarbons such as kerosene and gas oil (Fischer-Tropsch process), a hydrocarbon gas, such as a natural gas, is added with water vapor so as to be reformed, thereby producing a synthetic gas containing hydrogen, carbon monoxide, and carbon dioxide, as described in Patent Document 1 and Patent Document 2. Methods for adding water vapor to a gas in the above processes include a method for humidifying a natural gas using a saturator as well as a method for directly adding steam to a natural gas There is also a case in which a saturator is disposed in a gas turbine, in which water vapor is added to a combustion gas, so as to humidify the combustion gas.

A saturator recovers heat from another heat source (gas) in a heat exchanger, uses the recovered heat to heat gas flowing through the internal of the saturator, and sprays water into the gas to vaporize the water, so as to add water vapor to the gas.

CITATION LIST

Patent Literatures

Patent Document 1: Japanese Unexamined Patent Application Publication No. 2003-34660A
Patent Document 2: Japanese Unexamined Patent Application Publication No. 2004-277186A

SUMMARY OF INVENTION

Technical Problem

There is a need in the above saturator to more efficiently recover heat from another heat source. For example, in a case where a saturator is disposed for a process to reform a natural gas, employed is a saturator which is configured in such a manner that a low-temperature natural gas into which water has been sprayed is heated by heat exchange with a high-temperature synthetic gas, and then discharged as high-temperature natural gas containing water vapor having saturation vapor pressure. However, it has been considered that there is room for even more efficient recovery of heat from synthetic gas which is in a lower temperature range.

Also, to reliably reform a raw material gas with water vapor, it is necessary to add surplus water vapor relative to the carbon content. In cases where the temperature of the saturated raw material gas is low after passing through the saturator, it is necessary to separately add water vapor before feeding the saturated raw material gas into the reformer, because the quantity of water vapor contained therein is insufficient to the quantity required. Consequently, it is desirable for the above saturator to discharge a saturated gas with a higher content of water vapor, obtained by being humidified at a high temperature.

An object of the present invention is to provide a saturator that makes it possible to more efficiently recover and use heat from a heat source to maximize the quantity of water vapor added to a gas (fluid).

Solution to Problem

An aspect of the present invention is a saturator that comprises: a flow path through which a first fluid flows; one or a plurality of first heat exchange units disposed along a flow direction in the flow path of the first fluid, the first heat exchange unit causing heat exchange between the first fluid and a second fluid; a second heat exchange unit disposed on a downstream side of the first heat exchange unit along the flow direction in the flow path of the first fluid, the second heat exchange unit causing heat exchange between a third fluid and the first fluid after passing through the first heat exchange unit; a humidifying unit for adding water to the first fluid flowing through the flow path on an upstream side of the first fluid of the first heat exchange unit and second heat exchange unit; and a conveyance path for conveying the third fluid after being heat-exchanged in the second heat exchange unit from the second heat exchange unit to the upstream side of the first fluid of the first heat exchange unit so as to flow the third fluid to flow into the flow path as the first fluid. In the first heat exchange unit, the first fluid is heated and humidified, and the second fluid is cooled and discharged outside a system, and in the second heat exchange unit, the first fluid is heated and humidified to saturation vapor pressure and discharged outside the system, and the third fluid is cooled.

In the above aspect, it is preferred that the flow path be one column for accommodating the first heat exchange unit and the second heat exchange unit.

Alternatively, it is preferred in the above aspect that the flow path be piping for connecting a plurality of vessels with one another, in which the first heat exchange unit and second heat exchange unit are accommodated in the respective vessels.

In the saturator of the above aspect, a plurality of heat exchange units is disposed in the flow path. In the second heat exchange unit, the third fluid having a high temperature, which is the same gas as the first fluid, is used to heat and humidify the first fluid immediately before being discharged from the saturator. The third fluid also flows into the flow path of the saturator as the first fluid and is used to cool the second fluid in the first heat exchange unit.

Employing the above configuration makes it possible to increase the temperature of the first fluid which is discharged from the saturator, and makes it possible to decrease the temperature of the second fluid. Consequently, the efficiency of heat recovery inside the system is improved. Additionally, decreasing the temperature of the second fluid is preferable because it leads to decreasing the quantity of waste heat from the second fluid in a post stream of the saturator.

Another aspect of the present invention is a natural gas reforming system that is provided with a reformer that causes a natural gas constituting the first fluid to react with water vapor to produce a synthetic gas constituting the second fluid and containing hydrogen, carbon monoxide, and carbon dioxide, a tank for storing a natural gas constituting the third fluid, and the saturator of the above aspect.

For example, in a case where the saturator is disposed in a natural gas reforming system, it becomes possible to decrease the quantity of water vapor added from outside the system (e.g., from a boiler) to the humidified natural gas (first fluid), whereby the operating efficiency of the system can be improved.

Advantageous Effects of Invention

According to the present invention, the temperature of the first fluid that is discharged from the saturator is further increased, and the temperature of the second fluid is further decreased. Namely, the saturator of the present invention is capable of heat recovery better than conventional products, resulting in improved thermal efficiency of the overall system.

If the saturator of the present invention is disposed in a natural gas reforming system, the quantity of water vapor added from outside the system to the natural gas that is a raw material gas can be reduced, and the consumption of the natural gas that is a raw material for production can also be reduced.

DESCRIPTION OF EMBODIMENTS

The saturator of the present invention is applied to a methanol synthesis system or liquid hydrocarbon synthesis system that adds water vapor to a raw material gas, or to a gas turbine that adds water vapor to a combustion gas or combustion air.

Embodiments of the saturator of the present invention will be described below, offering an example of a natural gas reforming (steam reforming) system.

Figure 1:
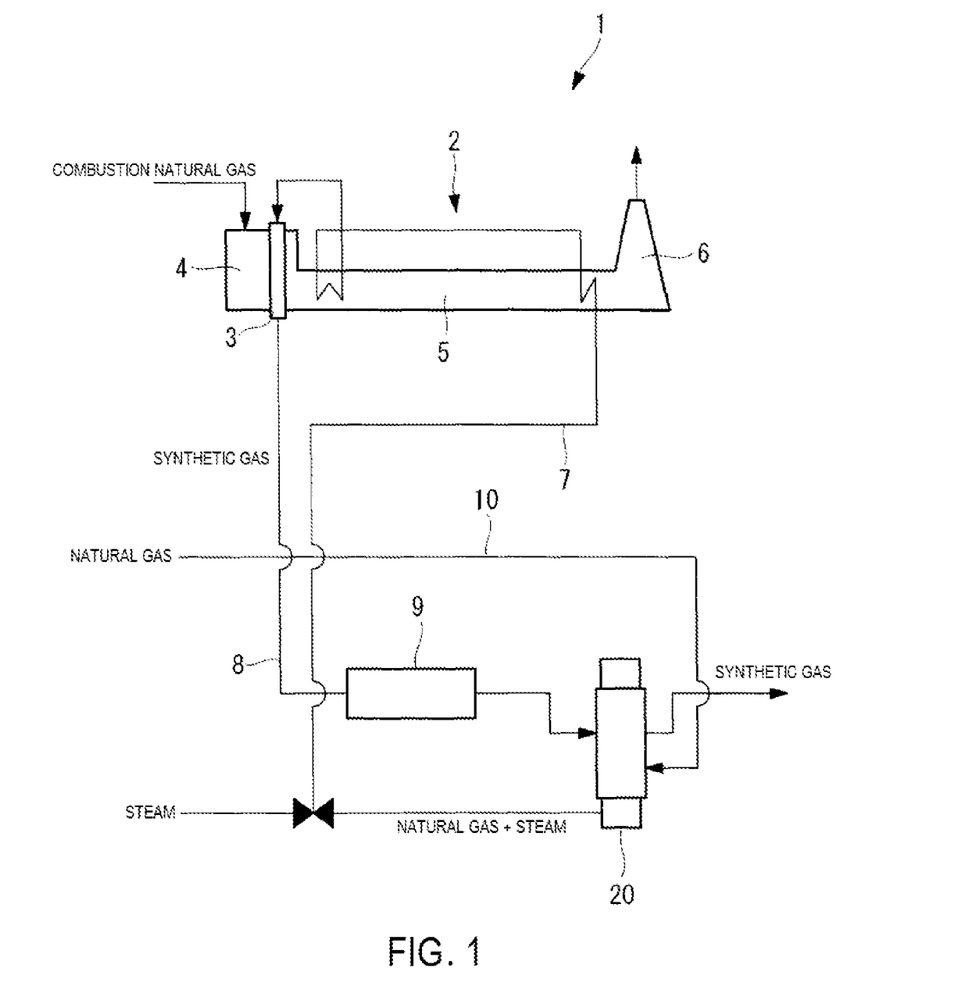
FIG. 1 is a schematic diagram of a natural gas reforming system.

FIG. 1 is a schematic diagram of a natural gas reforming system. A natural gas reforming system 1 is provided with a reformer 2, a waste heat boiler 9, a natural gas supply line 10, and a saturator 20.

The reformer 2 is provided with a reaction tube 3, a reforming furnace 4, a waste heat recovering unit 5 and a chimney 6. The reaction tube 3 is disposed in the reforming furnace 4. The reaction tube 3 has a catalyst (e.g., nickel-based catalyst and the like) filled therein. The reaction tube 3 is connected with the saturator 20 via piping 7. The piping 7 is constructed so as to pass through the waste heat recovering unit 5. Additionally, with piping 8, the reaction tube 3 is connected with the saturator 20 via the waste heat boiler 9.

Combustion gas (e.g., natural gas) and air are supplied to the reforming furnace 4 from piping (not illustrated). The reaction tube 3 is heated to around 850 to 900° C. by combustion of the combustion gas in the reforming furnace 4. Combustion exhaust gas in the reforming furnace 4 is conveyed through the waste heat recovering unit 5 to the chimney 6, and discharged outside the reformer 2 from the chimney 6.

The natural gas supply line 10 is connected with the saturator 20. The natural gas supply line 10 is connected with a natural gas supply source (not illustrated).

First Embodiment

Case 1

Figure 2:
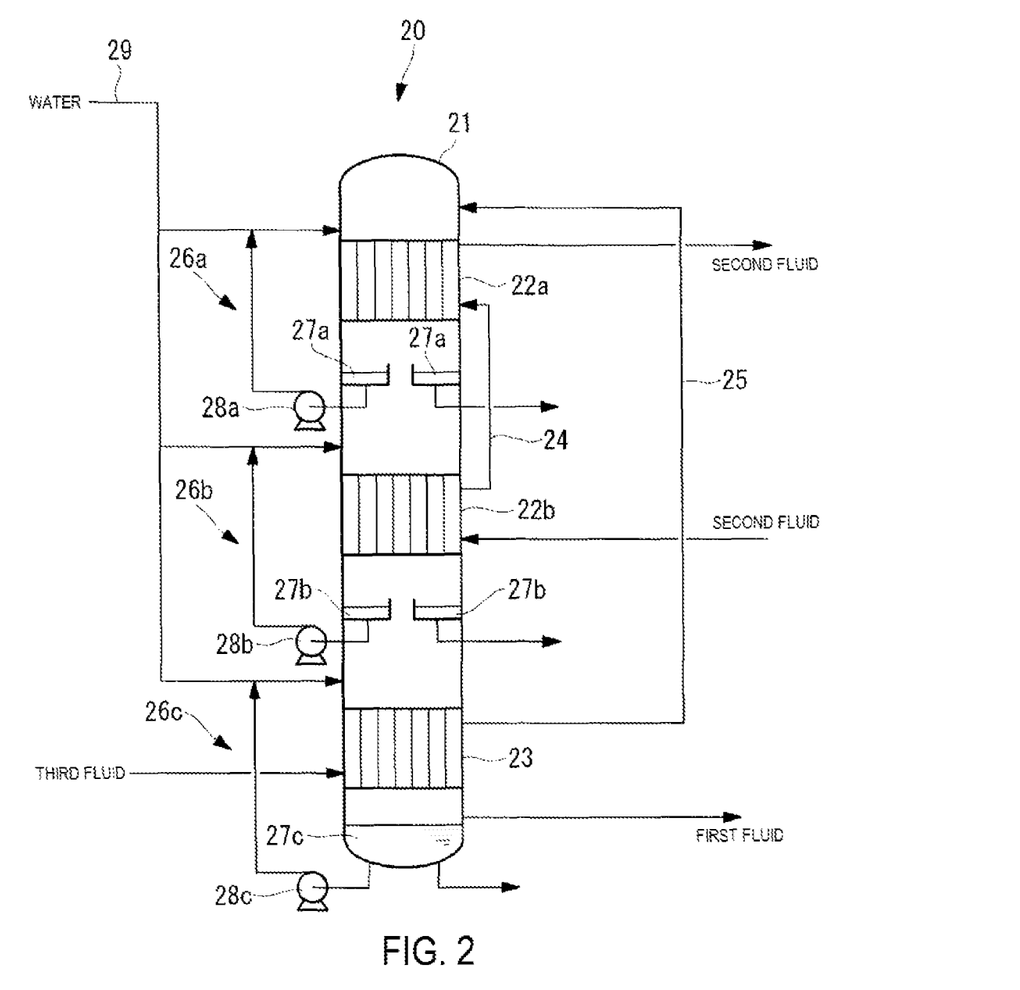
FIG. 2 is a schematic diagram of a saturator in Case 1.

FIG. 2 is a schematic diagram of an example (Case 1) of the saturator of a First Embodiment. The saturator 20 in Case 1 has first heat exchange units 22a, 22b and a second heat exchange unit 23 disposed in a column 21. A first fluid flows through the column 21 downward from the upper side of the page. Namely, the column 21 is a flow path through which the first fluid flows. In a case where the saturator is disposed in the natural gas reforming system, the first fluid is a natural gas.

The first heat exchange units 22a, 22b are shell-type heat exchange units. In the shell-type heat exchange unit, a plurality of tubes is disposed at the periphery of the column 21, and a second fluid flows through the tubes. In a case where the saturator is disposed in the natural gas reforming system 1, the second fluid is a synthetic gas that is fed from the reaction tube 3. In the first heat exchange units 22a, 22b, heat exchange occurs between the first fluid and the second fluid in a non-contact manner.

One or more first heat exchange units are disposed along the flow direction of the first fluid. The saturator 20 in Case 1 is constructed so as to have two first heat exchange units provided therein. When a plurality of first heat exchange units is disposed, first heat exchange units 22a, 22b located adjacent to each other are connected by piping 24. The second fluid flows through the piping 24. In the saturator 20 in FIG. 2, the second fluid flows into the saturator 20 from the first heat exchange unit 22b located on a downstream side of the first fluid, and is discharged outside the saturator 20 from the first heat exchange unit 22a located on a upstream side of the first fluid.

The second heat exchange unit 23 is disposed on the downstream side of the first fluid of the first heat exchange units 22a, 22b. The second heat exchange unit 23 is a shell-type heat exchange unit, wherein a third fluid flows through tubes disposed at the periphery of the column 21. In a case where the saturator is disposed in the natural gas reforming system 1, the third fluid is a natural gas (raw material gas). The third fluid is supplied from the natural gas supply line 10. In the second heat exchange unit 23, heat exchange occurs between the first fluid and the third fluid in a non-contact manner.

The second heat exchange unit 23 is connected with the upper portion of the column 21 through a conveyance path 25. The third fluid flows through the conveyance path 25. The third fluid flows into the column 21 from the upper portion of the column 21, and flows through the column 21 as the first fluid.

Humidifying units 26a, 26b, 26c are disposed in the first heat exchange units 22a, 22b and the second heat exchange unit 23, respectively. The humidifying units 26a, 26b, 26c are provided with spraying units (not illustrated) that spray water into the first fluid flowing through the column 21, storage units 27a, 27b, 27c that recover and store excess water after spraying and condensed water, and pumps 28a, 28b, 28c that circulate water in the storage units 27a, 27b, 27c to the spraying units. The spraying units are disposed on the upstream sides of the first fluid of the first heat exchange units 22a, 22b and second heat exchange unit 23.

Piping 29 is connected on the upstream sides of the first heat exchange units 22a, 22b and second heat exchange unit 23. Water is supplied from outside the saturator 20 into the first fluid through the piping 29. Water supplied through the piping 29 may be industrial water, or may be condensed water produced when the second fluid discharged outside the saturator 20 from the first heat exchange unit 22a is further cooled.

A process for humidifying gas using the saturator 20 in Case 1 will be described below, with an illustration of an example of humidifying natural gas.

A natural gas having a high temperature flows into the second heat exchange unit 23 as the third fluid. The third fluid is heated by, for example, passing from the natural gas supply line 10 through the waste heat recovering unit 5 in the reformer 2. Specifically, before flowing into the second heat exchange unit 23, the third fluid is heated to around 380° C. to 400° C. (temperature $T_1$). Further, the third fluid contains almost no water vapor.

In the second heat exchange unit 23, heat exchange is performed between the first fluid (temperature $T_9$) flowing through the column 21 and the third fluid. This heat exchange cools the third fluid to a temperature $T_2$.

Cooled to the temperature $T_2$, the third fluid flows through the conveyance path 25 and flows into column 21 from the upper portion of the column 21 as the first fluid. The first fluid flows through the column 21 downward from the upper portion of the column 21.

The spraying unit of humidifying unit 26a sprays water into the first fluid before flowing into the first heat exchange unit 22a. The sprayed water comes in contact with the first fluid (temperature $T_2$) and then vaporizes, adding water vapor to the first fluid. At the same time, the first fluid is cooled to a temperature $T_3$ by the heat of vaporization. It is advantageous that if the first fluid contains water vapor with saturation vapor pressure at this time, it leads to increasing heat recovery efficiency and decreasing the quantity of water vapor added from outside the system, which will be described below, thereby increasing the energy efficiency of the overall natural gas reforming system 1.

A synthetic gas is produced as the second fluid by the reaction tube 3 of the reformer 2.

A natural gas (including hydrocarbons whose main component is $CH_4$) humidified by the saturator 20 through the process described below is supplied from the piping 7 to the reaction tube 3. In the reaction tube, the hydrocarbons in the natural gas reacts with water vapor to produce carbon monoxide (CO) and hydrogen ($H_2$). The CO thus produced further reacts with water vapor to produce carbon dioxide ($CO_2$) and $H_2$. Namely, the synthetic gas contains $H_2$, CO, $CO_2$, and water vapor.

After being cooled in the waste heat boiler 9 through the piping 8, the synthetic gas discharged from the reaction tube 3 is conveyed to the saturator 20. Specifically, by routing synthetic gas discharged from the reformer 2 at from 850 to 900° C. through the waste heat boiler 9, the synthetic gas is cooled from around 300 to 400° C. (temperature $T_{11}$), and then supplied to the first heat exchange unit 22b in the saturator 20.

The synthetic gas flows into the first heat exchange unit 22b as the second fluid. The second fluid that has flowed through the first heat exchange unit 22b then flows via the piping 24 into the first heat exchange unit 22a. The second fluid that has flowed through the first heat exchange unit 22a is then discharged outside the saturator 20.

In the first heat exchange units 22a, 22b, heat exchange is performed between the first fluid and the second fluid flowing through the column 21. The first fluid is heated by this heat exchange. Meanwhile, the second fluid is cooled. In Case 1, the first fluid is heated in the first heat exchange unit 22a from an inlet temperature $T_3$ to an outlet temperature $T_4$, and then heated in the first heat exchange unit 22b from an inlet temperature $T_5$ to an outlet temperature $T_6$. The second fluid is cooled in the first heat exchange unit 22b from the temperature $T_{11}$ to a temperature $T_{13}$, and then cooled in the first heat exchange unit 22a from the temperature $T_{13}$ to a temperature $T_{14}$.

In the saturator 20 in Case 1, the spraying units of the humidifying units 26a, 26b spray water into the column 21 from the upper sides of the first heat exchange units 22a, 22b. As passing through the first heat exchange units 22a, 22b, the sprayed water is vaporized by the heat of the first fluid and the second fluid. This process heats the first fluid while maintaining saturation vapor pressure, as the first fluid passes through the first heat exchange units 22a, 22b.

Excess water after spraying and condensed water are recovered in the storage units 27a, 27b and circulated to the spraying units in the humidifying units 26a, 26b by the pumps 28a, 28b.

The first fluid, having passed through the first heat exchange unit 22b and reached a temperature $T_6$, flows into the second heat exchange unit 23 with a temperature $T_9$. The first fluid is heat-exchanged with the third fluid and is heated from the temperature $T_9$ to a temperature $T_{10}$ in the second heat exchange unit 23.

The spraying unit of the humidifying unit 26c sprays water into the column 21 from the upper side of the second heat exchange unit 23. As passing through the second heat exchange unit 23, the sprayed water is vaporized by the heat of the first fluid and the third fluid. As passing through the second heat exchange unit 23, the first fluid is heated while maintaining saturation vapor pressure due to this process.

The first fluid, having passed through the second heat exchange unit 23, is discharged, together with water vapor having saturation vapor pressure, from the saturator 20 and is conveyed through the piping 7 to the reaction tube 3 of the reformer 2. Further, a natural gas is reformed in the reaction tube 3 described above so that a ratio of the quantity of water vapor with respect to the quantity of carbon is about 2 to 3 times. Water vapor may also be added to the first fluid in the middle of the piping 7 in order to reach the above water vapor ratio.

Case 2

Figure 3:
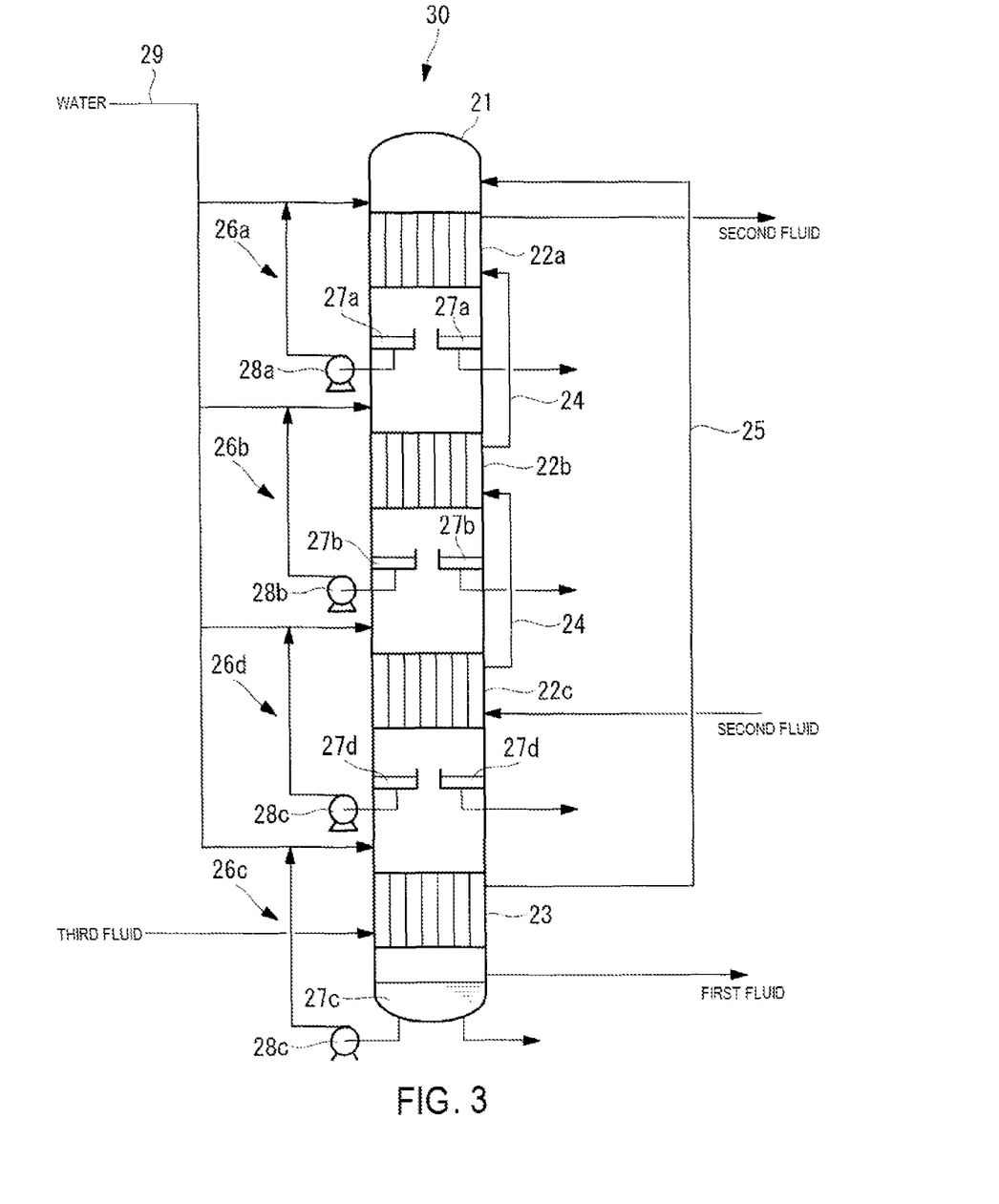
FIG. 3 is a schematic diagram of a saturator in Case 2.

FIG. 3 is a schematic diagram of another example (Case 2) of the saturator of the First Embodiment. The saturator 30 in Case 2 has the same configuration as the saturator 20 in FIG. 2, except that three first heat exchange units (22a to 22c) are disposed, and a humidifying unit 26d is disposed in the first heat exchange unit 22c. The first heat exchange units 22a to 22c are connected by the piping 24.

In Case 2, the first fluid is heated from an inlet temperature $T_7$ to an outlet temperature $T_8$ in the first heat exchange unit 22c. The first fluid having the temperature $T_8$ reaches the second heat exchange unit 23 with the first fluid having a temperature $T_9$. Since the humidifying unit 26d sprays water from the upper portion of first heat exchange unit 22c, the first fluid passes through the first heat exchange unit 22c, while maintaining saturation vapor pressure and being heated.

Additionally, the second fluid flows from the reaction tube 3 of the reformer 2 into the first heat exchange unit 22c via the waste heat boiler 9. The second fluid is cooled from the temperature $T_{11}$ to a temperature $T_{12}$ in the first heat exchange unit 22c, cooled from the temperature $T_{12}$ to the temperature $T_{13}$ in the first heat exchange unit 22b, and then cooled from the temperature $T_{13}$ to the temperature $T_{14}$ in the first heat exchange unit 22a. The second fluid having the temperature $T_{14}$ is discharged from the saturator 20.

The thermal efficiency of the overall system is improved in Cases 1 and 2 because the second heat exchange unit is disposed and the first fluid is heated using the heat of the third fluid that is the same gas and has a high temperature. A temperature differential ΔT between the temperature $T_9$ of the first fluid and the temperature $T_2$ of the third fluid can be optionally set under conditions that satisfy $T_2>T_9$. Making this temperature differential ΔT smaller increases the heat recovery efficiency of the overall system since the heat of the third fluid can be used to heat the first fluid, which is the same as the third fluid.

A smaller temperature differential ΔT leads to a lower temperature $T_2$. The lower the temperature $T_2$ of the third fluid, the more the temperature $T_3$ of the first fluid can be decreased after water has been sprayed at the upper portion of the first heat exchange unit 22a in the column 21. The lower the temperature $T_3$ of the first fluid, the more heat recovery from the second fluid is increased.

As the number of first heat exchange units to be disposed increases, the more heat can be recovered from the second fluid, the more the temperature $T_{14}$ of the second fluid discharged from the saturator 20, 30 can be lowered, and the more the temperature $T_{10}$ of the first fluid can be raised. However, in order for heat to be recovered, the temperature of the second fluid must be higher than the temperature of the first fluid in each of the first heat exchange units. The number of first heat exchange units to be disposed is appropriately set within the range at which this temperature relationship is achieved.

Case 3

Figure 4:
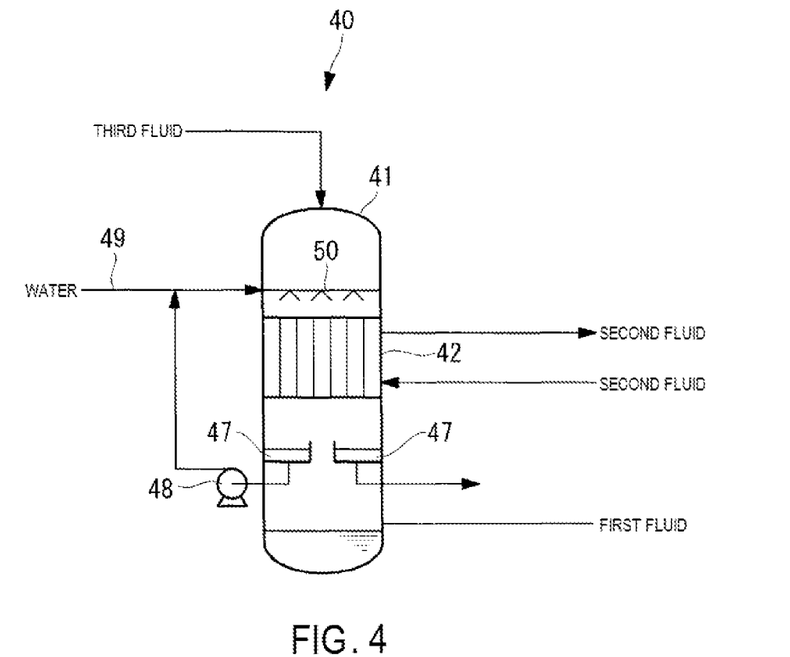
FIG. 4 is a schematic diagram of a saturator in Case 3.

FIG. 4 is a schematic diagram of a saturator as a comparative example (Case 3). The saturator 40 in Case 3 has one first heat exchange unit 42 disposed in a column 41, and does not have a second heat exchange unit disposed.

In Case 3, the third fluid (temperature $T_1$: 380 to 400° C.) flows into the column 41 from the upper portion of the column 41 as the first fluid. As in Case 1, water is supplied from outside the system through piping 49 to a spraying unit 50 of a humidifying unit 46, and the water is sprayed into the first fluid from the spraying unit at the upper portion of the first heat exchange unit 42. The spraying of water cools the first fluid to the temperature $T_3$ and humidifies the first fluid to saturation vapor pressure. In Case 3, excess water after spraying and condensed water are recovered in a storage unit 47, and circulated by a pump 48 to the spraying unit of the humidifying unit 46.

While the first fluid is flowing through the first heat exchange unit 42, heat exchange is performed between the first fluid and the second fluid. Due to this process, the first fluid is heated from the temperature $T_3$ to the temperature $T_{10}$, while maintaining saturation vapor pressure, and is then discharged from the saturator 40. The second fluid is cooled by the above heat exchange from the temperature $T_{11}$ to the temperature $T_{14}$, and is then discharged from the saturator 40.

Examples of the temperatures $T_1$ to $T_{14}$ in the saturators in Cases 1 to 3 are shown in Table 1. The temperature $T_1$ of the third fluid and the temperature $T_{11}$ of the second fluid, which flow into the saturators, in Cases 1 and 2 are the same as those in Case 3.

TABLE 1

|     | Case 1 | Case 2 | Case 3 |
|-----|--------|--------|--------|
| T1  | 385    | 385    | 380    |
| T2  | 186    | 192    |        |
| T3  | 127    | 126    | 157    |
| T4  | 151    | 145    |        |
| T5  | 153    | 147    |        |
| T6  | 182    | 161    |        |
| T7  |        | 162    |        |
| T8  |        | 187    |        |
| T9  | 181    | 187    |        |
| T10 | 188    | 192    | 183    |
| T11 | 352    | 352    | 352    |
| T12 |        | 184    |        |
| T13 | 200    | 159    |        |
| T14 | 160    | 154    | 200    |

Since the second heat exchange unit 23 is disposed and the heat of the third fluid having a high temperature is used to heat the first fluid in Cases 1 and 2, the temperature $T_{10}$ of the first fluid after being humidified by the saturator is higher than that in Case 3.

In the case of the natural gas reforming system 1, the first fluid that has been discharged from the saturator and further added with water vapor is fed to the reaction tube 3 of the reformer 2 in order to reach the quantity of water vapor necessary to produce the synthetic gas as described above. Since the quantity of water vapor in the first fluid is equivalent to saturation vapor pressure in Cases 1 to 3, the quantity of water vapor in the first fluid discharged from the saturator is greater in Cases 1 and 2 than in Case 3. Therefore, when the saturators 20, 30 are disposed in Cases 1 and 2, the quantity of water vapor to be added from outside the system can be decreased.

Additionally, since the third fluid having a lower temperature flows into the upper portion of the column 21 in Cases 1 and 2, the temperature $T_3$ at the upstream of the first fluid of the first heat exchange unit 22a can be decreased more than that in Case 3. The quantity of heat recovered from the second fluid by heat exchange in the first heat exchange units 22a to 22c can be increased in Cases 1 and 2, improving the thermal efficiency of the system and making it possible to vastly decrease the temperature of the second fluid discharged from the saturator. The second fluid (synthetic gas) discharged from the saturators 20, 30 is further cooled in the natural gas reforming system 1, but the quantity of waste heat from the second fluid on the post stream side can be decreased by Cases 1 and 2.

Second Embodiment

Figure 5:
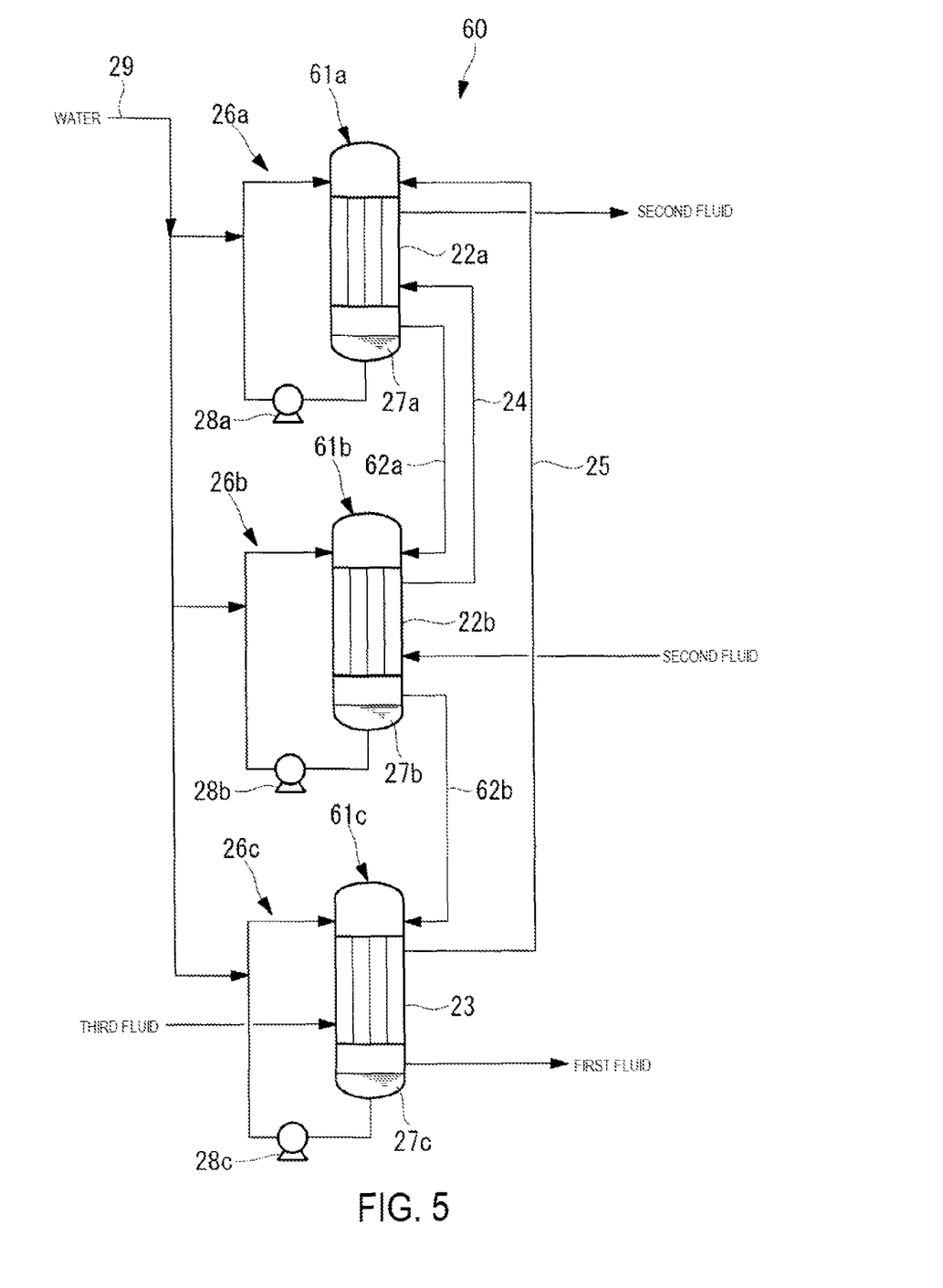
FIG. 5 is a schematic diagram of an example of a saturator of a second embodiment

FIG. 5 is a schematic diagram of an example of the saturator of a Second Embodiment. In FIG. 5, the same symbols are used for the same constituents as in the First Embodiment.

A saturator 60 of the Second Embodiment is provided with a plurality of vessels 61a to 61c. Shell-type first heat exchange units 22a, 22b are accommodated inside the vessels 61a, 61b, respectively. A shell-type second heat exchange unit 23 is accommodated inside the vessel 61c.

The vessel 61a and the vessel 61b are connected by piping 62a. The vessel 61b and the vessel 61c are connected by piping 62b. Consequently, the vessel 61a, piping 62a, vessel 61b, piping 62b, and vessel 61c constitute a flow path through which a first fluid flows.

The second heat exchange unit 23 in the vessel 61c is connected through a conveyance path 25 to the upper portion of vessel 61a. A third fluid flows through the conveyance path 25. The third fluid flows into the vessel 61a from the upper portion of the vessel 61a, and flows through the flow path as the first fluid.

The vessel 61a and the vessel 61b are connected with one another by piping 24. A second fluid flows through a tube disposed at the periphery of the vessel 61b which accommodates the first heat exchange unit 22b, flows through a tube disposed at the periphery of the vessel 61a which accommodates the first heat exchange unit 22a, and is then discharged outside the saturator 60.

Humidifying units 26a to 26c are disposed for the respective vessels 61a to 61c. Piping 29 is connected to each of the vessels 61a to 61c. The locations at which the piping 29 is connected are on the upstream sides of the first fluid of the first heat exchange units 22a, 22b and second heat exchange unit 23.

An example of a case in which two first heat exchange units are disposed is illustrated in FIG. 5, but one or three or more first heat exchange units may be disposed.

Heat exchange is performed in the saturator 60 of the Second Embodiment in the same manner as in Case 1 of the First Embodiment.

Namely, heat exchange is performed in the second heat exchange unit 23 in the vessel 61c between the first fluid (temperature $T_9$) and third fluid flowing through the flow path. This heat exchange cools the third fluid to a temperature $T_2$.

Cooled to the temperature $T_2$, the third fluid flows through the conveyance path 25 and flows as the first fluid into the vessel 61a from the upper portion of the vessel 61a.

A spraying unit of the humidifying unit 26a sprays water into the first fluid before flowing into the first heat exchange unit 22a. The sprayed water comes in contact with the first fluid (temperature $T_2$) and vaporizes, adding water vapor to the first fluid and bringing the temperature of the first fluid to a temperature $T_3$.

A synthetic gas discharged from a reaction tube 3 as the second fluid is cooled to a temperature $T_{11}$ (around 300 to 400° C.), and then supplied to the first heat exchange unit 22b in the vessel 61b.

Heat exchange is performed between the first fluid and the second fluid in the first heat exchange units 22a, 22b. The first fluid is heated in the first heat exchange unit 22a from an inlet temperature $T_3$ to an outlet temperature $T_4$, and is then conveyed through the piping 62a from the vessel 61a to the vessel 61b. The first fluid is heated from an inlet temperature $T_5$ to an outlet temperature $T_6$ in the first heat exchange unit 22b.

The second fluid is cooled in the first heat exchange unit 22b from the temperature $T_{11}$ to a temperature $T_{13}$, and is then conveyed through the piping 24 from the vessel 61b to the vessel 61a. The second fluid is cooled from the temperature $T_{13}$ to a temperature $T_{14}$ in the first heat exchange unit 22a. The second fluid is discharged from the saturator 60 with the second fluid having the temperature $T_{14}$.

In the Second Embodiment as well, water sprayed from the spraying units of the humidifying units 26a, 26b is vaporized by the heat of the first fluid and the second fluid in the first heat exchange units 22a, 22b. Accordingly, as passing through the first heat exchange units 22a, 22b, the first fluid is heated while maintaining saturation vapor pressure.

Having passed through the first heat exchange unit 22b and reached the temperature $T_6$, the first fluid passes from the vessel 61b, through the piping 62b, and flows into the vessel 61c with the first fluid having the temperature $T_9$. The first fluid is heat-exchanged with the third fluid in the second heat exchange unit 23 in the vessel 61c, so as to be heated from the temperature $T_9$ to a temperature $T_{10}$. Since water is sprayed by the spraying unit of the humidifying unit 26c from the upper side of the second heat exchange unit 23 at this time, the first fluid passing through the second heat exchange unit 23 is heated, while maintaining saturation vapor pressure.

The first fluid, having passed through the second heat exchange unit 23, is discharged, together with water vapor having saturation vapor pressure, from the saturator 60 with the first fluid having the temperature $T_{10}$.

Since the saturator 60 in FIG. 5 performs heat exchange similar to that in Case 1, as described above, the temperatures $T_1$ to $T_{14}$ are nearly the same as those of Case 1 in Table 1. Namely, in the second embodiment as well, the temperature $T_{10}$ of the first fluid after being heated by the saturator can be made higher. The temperature $T_3$ of the first fluid at the upstream of the first heat exchange unit 22a can also be decreased.

REFERENCE SIGNS LIST

1 Natural gas reforming system
2 Reformer
3 Reaction tube
4 Reforming furnace
5 Waste heat recovering unit
6 Chimney
7, 8, 24, 29, 62a, 62b Piping
9 Waste heat boiler
10 Natural gas supply line
20, 30, 60 Saturator
21 Column
22a, 22b First heat exchange unit
23 Second heat exchange unit
25 Conveyance path
26a, 26b, 26c, 26d Humidifying unit
27a, 27b, 27c Storage unit
28a, 28b, 28c Pump
61a, 61b, 61c Vessel

The invention claimed is:
1. A natural gas reforming system comprising:
A reformer for causing a natural gas constituting a first fluid to react with water vapor to produce a synthetic gas constituting a second fluid and containing hydrogen, carbon monoxide, and carbon dioxide;
a natural gas supply line for supplying a natural gas constituting a third fluid; and a saturator, wherein the saturator comprises:
a flow path through which the first fluid flows;
one or a plurality of first heat exchange units disposed along a flow direction in the flow path of the first fluid, the first heat exchange unit causing heat exchange between the first fluid and the second fluid;
a second heat exchange unit disposed on a downstream side of the first heat exchange unit along the flow direction in the flow path of the first fluid, the second heat exchange unit causing heat exchange between the third fluid and the first fluid after passing through the first heat exchange unit;
a humidifying unit for adding water to the first fluid flowing through the flow path on upstream sides of the first fluid of the first heat exchange unit and second heat exchange unit; and
a conveyance path for conveying the third fluid after being heat-exchanged in the second heat exchange unit from the second heat exchange unit to the upstream side of the first fluid of the first heat exchange unit so as to flow the third fluid into the flow path as the first fluid;

in the first heat exchange unit, the first fluid being heated and humidified, and the second fluid being cooled and discharged outside a system; and in the second heat exchange unit, the first fluid being heated and humidified to saturation vapor pressure, and discharged outside the system, and the third fluid being cooled.

2. The saturator according to claim 1, wherein the flow path is one column for accommodating the first heat exchange unit and the second heat exchange unit.

3. The saturator according to claim 1, wherein the flow path is piping for connecting a plurality of vessels with one another; and wherein the first heat exchange unit and the second heat exchange unit are accommodated in the respective vessels.

* * * * *